United States Patent
Kretsis

(10) Patent No.: US 8,271,125 B2
(45) Date of Patent: Sep. 18, 2012

(54) METHOD AND SYSTEM OF JUXTAPOSING COMPONENTS IN AN ASSEMBLY PROCESS

(75) Inventor: George Kretsis, London (GB)

(73) Assignee: Anaglyph Ltd, London (GB)

( * ) Notice: Subject to any disclaimer, the term of this patent is extended or adjusted under 35 U.S.C. 154(b) by 605 days.

(21) Appl. No.: 12/377,952

(22) PCT Filed: Aug. 21, 2007

(86) PCT No.: PCT/GB2007/050500
§ 371 (c)(1),
(2), (4) Date: Feb. 18, 2009

(87) PCT Pub. No.: WO2008/023202

PCT Pub. Date: Feb. 28, 2008

(65) Prior Publication Data
US 2010/0168891 A1  Jul. 1, 2010

(30) Foreign Application Priority Data
Aug. 21, 2006  (GB) .................................. 0616410.7

(51) Int. Cl.
*G06F 19/00* (2011.01)
(52) U.S. Cl. .................................. 700/214; 340/539.13
(58) Field of Classification Search ................. 700/214, 700/215, 115, 212, 192, 259; 340/539.13, 340/571.1; 382/151, 145; 348/87
See application file for complete search history.

(56) References Cited

U.S. PATENT DOCUMENTS

| | | | |
|---|---|---|---|
| 4,479,865 A * | 10/1984 | Beder et al. ................... | 204/415 |
| 4,663,658 A | 5/1987 | Lanne et al. | |
| 5,739,846 A * | 4/1998 | Gieskes .......................... | 348/87 |
| 5,850,252 A * | 12/1998 | Miyata ............................ | 348/87 |
| 5,903,662 A * | 5/1999 | DeCarlo ....................... | 382/151 |
| 5,917,332 A * | 6/1999 | Chen et al. ............... | 324/750.02 |
| 6,230,393 B1 * | 5/2001 | Hirano et al. ................... | 29/740 |

(Continued)

FOREIGN PATENT DOCUMENTS
WO  WO-97/11386  3/1997

OTHER PUBLICATIONS
Christine Connolly, Inspection Systems for electronic circuts drom the Close-Ups, 2006, Stalactite Technologies Ltd. UK. Company, p. 283-286.*

(Continued)

*Primary Examiner* — Kidest Bahta
(74) *Attorney, Agent, or Firm* — Fay Sharpe LLP

(57) ABSTRACT

A computer model is formed of a mounting component (18) to be mounted at a target location on a mounting surface (12) of a base component (11). A position and viewing direction of a digital camera (3) is determined relative to the base component (11) and a live image (11') of the base component as viewed by the camera (3) is displayed on a monitor (4). The monitor (4) also displays a mounting component target image (18") generated by a computer (2) of the mounting component (18) mounted at the target location on the mounting surface (12) superimposed over the live image (11') of the base component. A user physically moves the mounting component (18) relative to the base component (11) until a live image of the mounting component as viewed by the camera (3) coincides with the mounting component target image (18").

25 Claims, 5 Drawing Sheets

U.S. PATENT DOCUMENTS

| | | | |
|---|---|---|---|
| 6,272,204 B1 * | 8/2001 | Amtower et al. | 378/63 |
| 6,356,352 B1 * | 3/2002 | Sumi et al. | 356/614 |
| 6,610,991 B1 * | 8/2003 | Case | 250/559.19 |
| 6,681,038 B2 * | 1/2004 | Vilella | 382/145 |
| 6,847,856 B1 * | 1/2005 | Bohannon | 700/115 |
| 6,931,714 B2 * | 8/2005 | Wisecarver et al. | 29/702 |
| 7,310,406 B2 * | 12/2007 | Kuriyama et al. | 378/57 |
| 2002/0122581 A1 | 9/2002 | Erickson et al. | |
| 2004/0071335 A1 * | 4/2004 | Vilella | 382/145 |

OTHER PUBLICATIONS

International Search Report for PCT/GB2007/050500.

* cited by examiner

METHOD AND SYSTEM OF JUXTAPOSING COMPONENTS IN AN ASSEMBLY PROCESS

BACKGROUND OF THE INVENTION

This application is the national filing of and claims the benefit of International Patent Application No. PCT/GB 2007/050500, filed on Aug. 21, 2007 and claims the priority benefit of GB Patent Application Serial No. 0616410.7, filed Aug. 21, 2006, the subject matter of which is incorporated herein by reference.

The present invention relates to a method and system of juxtaposing components in an assembly process.

It is often necessary for an operator to pinpoint the exact location of placement of a component during the manufacture of a large and/or complex assembly or structure. Such components may comprise composite fabric material plies stacked on a mould, electronic components fitted on a circuit board, or labels for positioning on a substrate.

This is also the case when an operator wishes to pinpoint an exact location for stencilling, for example, lettering on a surface or to position bolt holes.

An existing system to enable an operator to pinpoint the exact location of placement of a component in an assembly process has a laser above a base component on which a mounting component is to be mounted. The laser traces an outline of the mounting component on a mounting surface of the base component that a user of the system can see. The user then physically moves the mounting component until it coincides with the traced outline.

A problem with this system is that it is only suitable for a substantially flat surface. If the mounting surface bends away from the laser, the laser cannot accurately show the outline of the mounting component on the surface. Furthermore, a blockage above the mounting surface, such as a user's hand or a part of, say, a mould, may prevent the laser outline from being projected onto the mounting surface. Also, the system is expensive and cumbersome.

An object of the present invention is to provide a method and system of juxtaposing components in an assembly process which alleviates at least one of the above problems.

SUMMARY OF THE INVENTION

According to one aspect of the present invention, there is provided a method of juxtaposing components in an assembly process comprising the steps of:

forming a computer model of a mounting component to be mounted at a target location on a mounting surface of a base component;

providing a system including a computing means, a camera, and a display means;

providing a base component and a mounting component;

determining the position and viewing direction of the camera relative to the base component;

displaying a live image on the display means of the base component as viewed by the camera;

displaying on the display means a mounting component target image generated by the computing means of the mounting component mounted at the target location on the mounting surface superimposed over the live image of the base component; and moving the mounting component relative to the base component such that a live image of the mounting component as viewed by the camera coincides with the mounting component target image.

By moving the mounting component to coincide with the mounting component target image displayed on the display means, a user or operator ensures that the mounting component is correctly in place. The method provides accuracy and prevents error in misplacing the component and improves speed of assembly. As the position and viewing direction of the camera can be determined relative to the base component and the image on the display means is as viewed by the camera, the method can be used to accurately place a component on a complex mounting surface such as one which is curved possibly in more than one direction. The viewing direction preferably comprises the orientation of the camera.

The components may be plies of composite material to be placed correctly and accurately on a tool or mould for the purpose of manufacturing, constructing or assembling a composite material structure.

The mounting component target image may be a stencil for, say, lettering, and the mounting component may be a marking device to mark the mounting surface with regard to the stencil. The mounting component target image may be an outline of a hole to be formed and the mounting component may be, say, a drill to form the hole.

The computer model may be formed with the at least mounting surface of the base component.

The method may include altering the display on the display means of the mounting component target image to take account of the relative movement between the camera and the base component. Thus a user can move the camera and/or base component as necessary to get the best view point.

When the mounting component has been physically mounted on the base component so as to coincide with the mounting component target image superimposed over the live image of the base component, the combined base component and mounting component may become a new base component and the above-mentioned method of juxtaposing components in an assembly process is repeated with a further mounting component.

There may be displayed on the display means an image of the mounting surface of the base component generated by the computing means superimposed on the live image of the base component.

Instructions for the assembly of the components may be displayed together with the live image of the base component and the mounting component target image.

The method may include recording at least one said step of juxtaposing components in an assembly process so that at least one recorded step can be subsequently played back. Thus, errors in assembly can be subsequently picked up. In assembling plies this may include any deviation from the nominal ply position or orientation.

The step of determining the position and viewing direction of the camera relative to the base component may include providing the camera with a camera locator, and using the computing means to process signals from the camera locator to effect the determination. There may be a further step of determining a position of the camera locator relative to the base component which includes providing a movable locator, positioning the movable locator sequentially at plural predetermined locations on the base component, and using the computing means to process signals from the camera locator and the movable locator at said predetermined locations to determine the position of the camera locator relative to the base component. A transducer may be provided for receiving signals from the locators. The base component may be provided with a base component locator, and the computing means is used to take account of relative movement between the base component and the transducer. Each locator may be provided with at least three light sources and provide output signals from the transducer relating to light signals from said light sources.

The method preferably includes providing the mounting component target image with a target image point and the mounting component with a corresponding point marked thereon, and placing a part of the mounting component bearing the point on the base component before other parts of the mounting component once the live image of the mounting component and the mounting component target image coincide. This may be particularly useful when laying a ply on a convoluted mounting surface since such plies are generally tacky and difficult to move once contact with a mounting surface has occurred.

The moving step of the method may include orientating the mounting component to coincide with the orientation of the mounting component target image. The mounting component target image may be provided with an orientation indicator and the mounting component with a corresponding orientation mark marked thereon. When the orientation indicator and the orientation mark are aligned the mounting component will be correctly orientated on the base component.

The method may include calibrating the optical characteristics of the lens of the camera.

According to another aspect of the present invention, there is provided a system for juxtaposing components in an assembly process comprising:

a camera for viewing a base component;

display means for displaying a live image of the base component as viewed by the camera;

a computing means having a computer model of a mounting component to be mounted at a target location on a mounting surface of the base component, the computing means being arranged to determine the position and viewing direction of the camera relative to the base component, and generate and display on the display means an image of a mounting component target image at the target location superimposed over the live image of the base component.

The system may include wireless optical means to enable the computing means to determine the position and viewing direction of the camera relative to the base component. The camera may have a camera locator adapted to emit signals for use in determining a position of the camera and the base component may have a base component locator adapted to emit signals for use in determining a position of the base component. The system may use other optical means, laser trackers or gyroscopes, for example, to enable the computing means to determine the position and viewing direction of the camera relative to the base component or possibly non-optical means.

The camera may be mounted on a boom stand. Alternatively, the camera may be mounted on an articulated mechanical arm. The arm may have sensors connected to the computing means for use in determining the position and viewing direction of the camera relative to the base component. The camera may comprise a digital or analogue camera and the camera is a video camera.

The camera may include head mounting means attachable to the head of a user of the system and preferably uses optical means for determining the position and viewing direction of the camera relative to the base component.

The display means of the system conveniently comprises a computer screen. The display means may comprise a head-up display. The head-up display forms at least part of a virtual reality vision system and may, for example, comprise goggles.

BRIEF DESCRIPTION OF THE DRAWINGS

Embodiments of the present invention will now be described, by way of example, with reference to the accompanying schematic drawings, in which:—

DETAILED DESCRIPTION OF THE INVENTION

Figure 1:
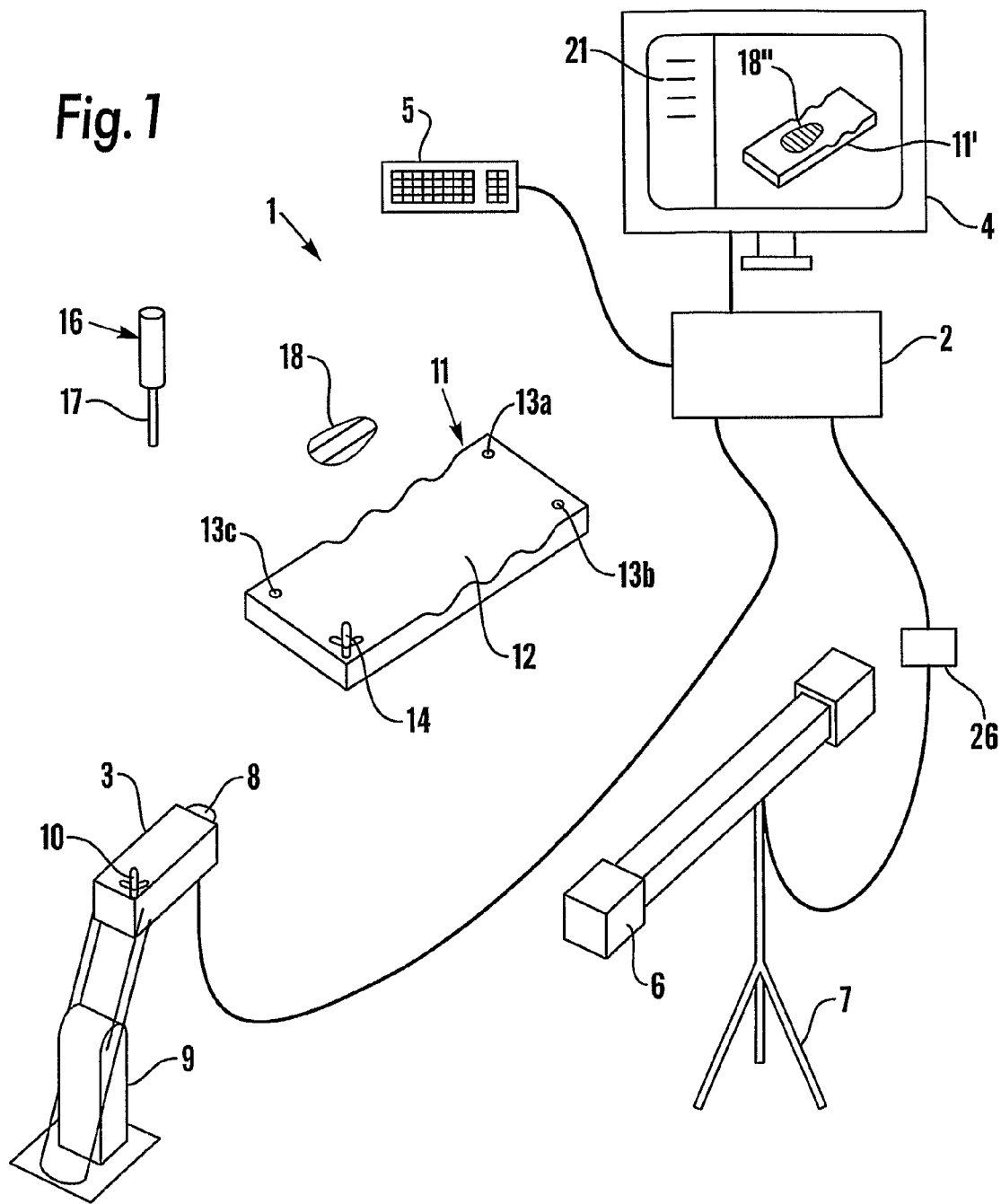
FIG. 1 shows a system for juxtaposing components in an assembly process according to one embodiment of the invention.

Referring to FIG. 1 of the accompanying drawings, a system 1 for juxtaposing components in an assembly process has a computer 2 to which are connected a digital camera 3, a display 4 or computer screen or monitor, a keyboard 5 for inputting data and a transducer 6 or sensor mounted on a tripod 7.

The digital camera has a lens 8 and is mounted on a boom stand 9 which enables the camera 3 to be moved about and the boom stand 9 has sufficient stiffness to hold the camera 3 in place after it has been moved about. The digital camera 3 has a camera locator 10 or probe mounted on it.

A base component 11 is provided on which other components are to be assembled and the base component 11 has (in the example illustrated) an undulating mounting surface 12. The base component 11 also has three location marks 13$a,b,c$ and a base component locator 14 or probe mounted on it.

Figure 2:
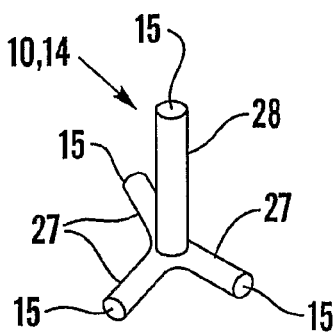
FIG. 2 shows a locator for a camera and a base component of the system.

Both the camera locator 10 and the base component locator 14 each have four light emitting diodes (LEDs) 15 as light sources (see FIG. 2) which are at the extremities of the locator. The locator is shown as having three legs 27 extending from a base of a protrusion 28 with an LED 15 at the distal end of each.

In order to use the system, the computer 2 needs to first determine the location of the camera 3 relative to the base component 11. A wireless movable locator 16 (see FIG. 1) or probe having four LEDs has a rod 17 at one end and the rod 17 is inserted into one of the location marks 13$a$ of the base component 11. The LEDs of the movable locator 16 emits light signals which are received by the transducer 6. The transducer 6 also receives light signals from the LEDs 15 of the camera locator 10 and sends output signals to the computer 2 relating to the light signals received from the LEDs of the movable locator 16 and the camera locator 10. The output signals are sent to the computer 2 via a control unit 26 which converts the LED signals into co-ordinates. The rod 17 is then sequentially inserted into each of the other two base component location marks 13$b,c$ and the signals received by the computer 2 via the control unit 26 from the movable locator 16 is used by the computer 2 to calculate the position of the camera locator 10 relative to the base component 11.

The optical characteristics of the lens 8 of the digital camera 3 are calibrated before the assembly process is begun.

A computer model of the base component is formed using computer aided design (CAD) software. The computer model includes a model of the mounting surface 12 of the base component 11 and a model of a mounting component 18 to be mounted at a target location on the mounting surface 12.

The transducer 6 receives light signals emitted from the LEDs 15 of the camera locator 10 and from the LEDs 15 of the base component locator 14 and sends output signals to the computer 2 relating to the light signals received from the LEDs 15. From these output signals the computer 2 determines the position and viewing direction of the camera 3 relative to the base component 11. This may be achieved by calculating coordinates for the camera 3 and the base component 11.

Figure 3:
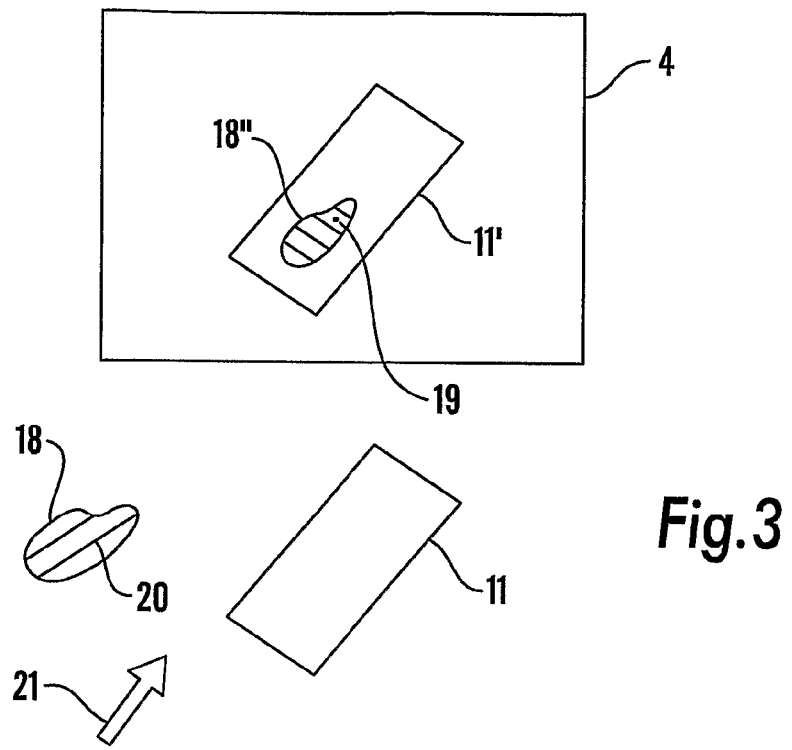
FIGS. 3 to 6 illustrate successive stages in mounting a mounting component on a base component using the system.
Figure 4:
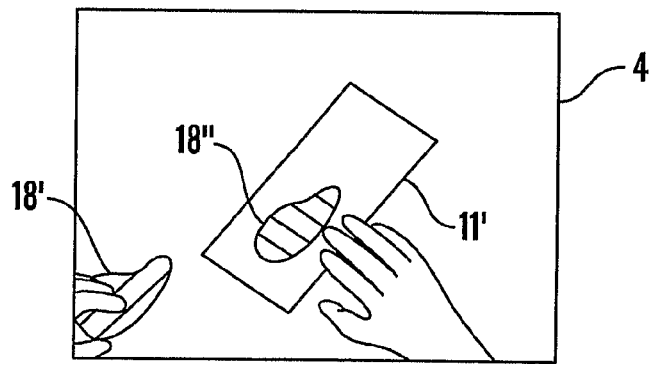
Figure 4:
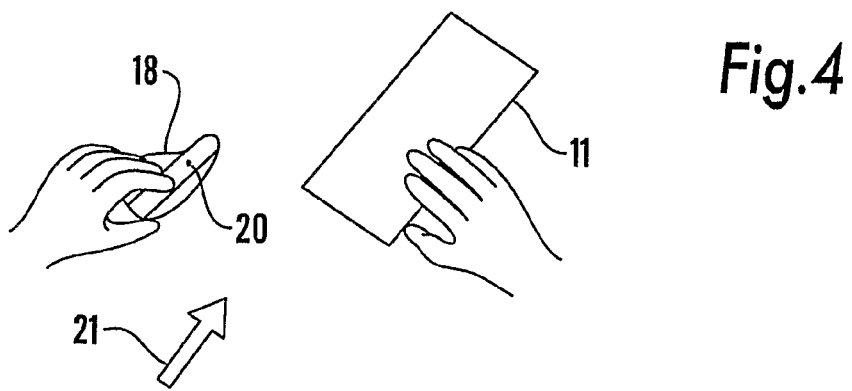
Figure 5:
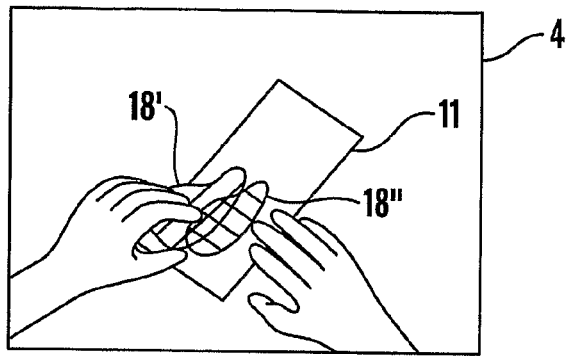
Figure 5:
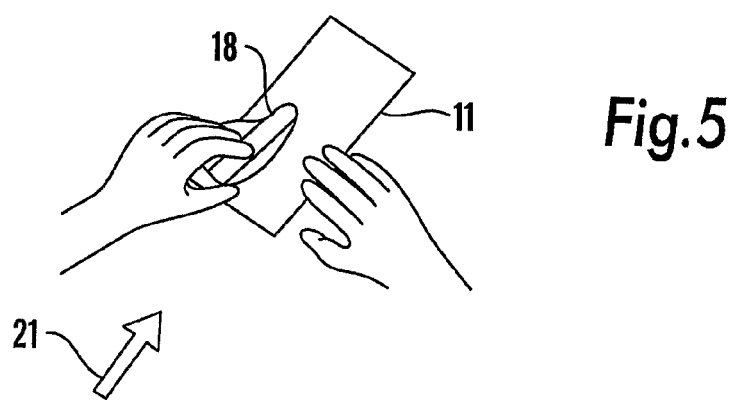

The digital camera 3 transmits a live image 11' of the base component 11 to the computer 2 and the live image 11' of the base component 11 as viewed by the camera 3 is displayed on the display 4 (see FIG. 3). Also displayed on the display 4 is a mounting component target image 18" generated by the computer 2 of the mounting component 18 mounted at the target location on the mounting surface 12. This target image 18" is superimposed over the live image 11' of the base component 11. This is done using a software application running on the computer 2 to manipulate the computer model to match the live image. In addition, the displayed mounting component target image 18" is provided with a target image point 19 which includes a target reference orientation indicator 29.

A user of the system 1 looking at the display 4 moves the mounting component 18 relative to the base component 11 and the mounting component has a point 20 marked thereon corresponding to the target image point 19 of the displayed mounting component target image 18" (see FIGS. 4 and 5) and a target orientation sign 30 to correspond to the target reference orientation indicator 29. The position and direction of the camera 3 and the live image from the camera are continuously fed to the computer 2 via suitable interfaces. The arrow 21 in FIGS. 3 to 6 shows the direction of viewing of the camera 3.

Figure 6:
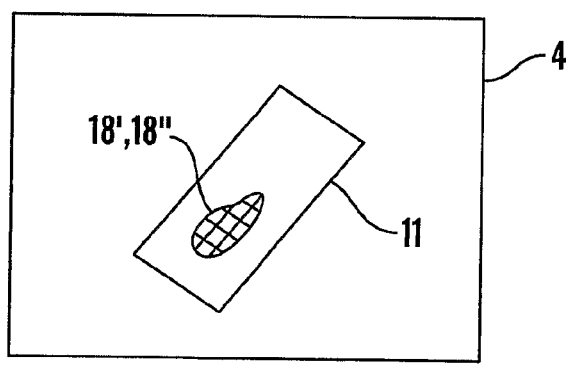
Figure 6:
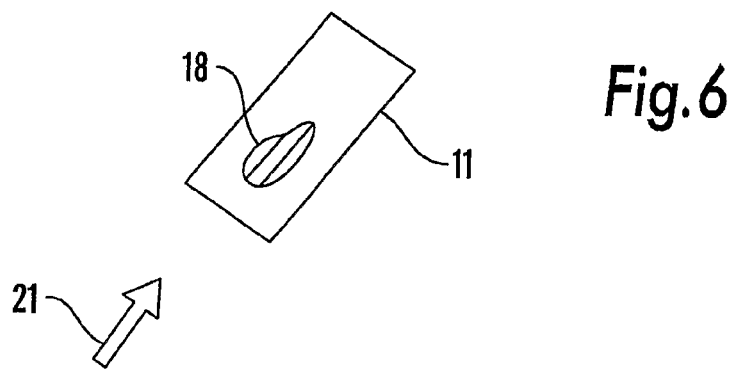
Figure 7:
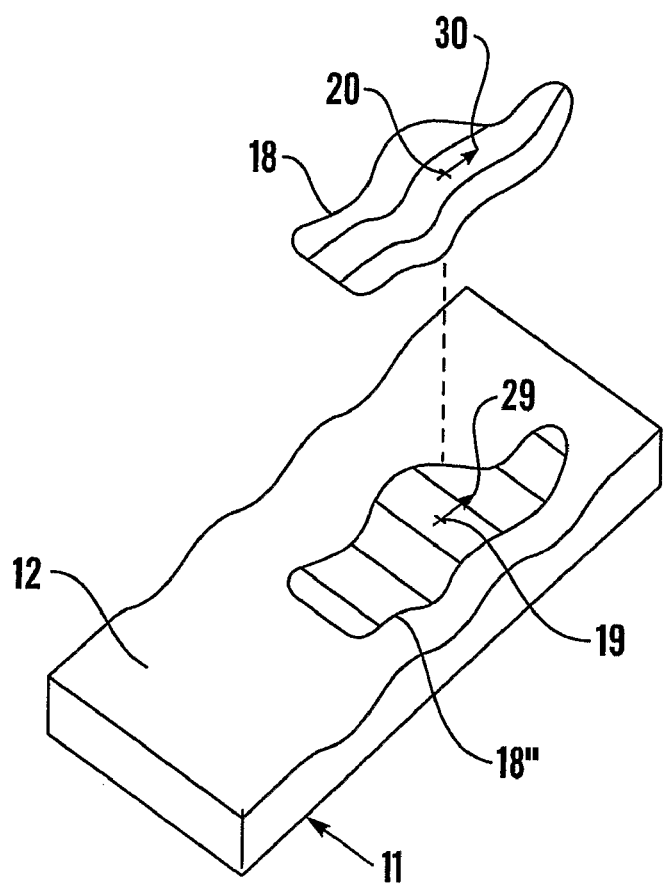
FIG. 7 is an exploded view of the mounting component mounted on the base component.

The user moves the mounting component 18 until a live image 18' of the mounting component as viewed by the camera 3 coincides with the mounting component target image 18" and the user places a part of the mounting component 18 bearing the point 20 on the base component 11 before other parts of the mounting component 18 (see FIGS. 6 and 7). The user can then press down the rest of the mounting component on the undulating mounting surface 12 so that the mounting component 18 is accurately placed. Furthermore, aligning the target orientation sign 30 with the target reference orientation indicator 29 ensures that the mounting component 18 is placed in the correct orientation.

If there is any relative movement between the camera 3 and the base component 11, the display of the mounting component target image 18" on the display 4 is altered accordingly. If there is any relative movement between the base component 11 with its locator 14 and the transducer 6, the display of the mounting component target image 18" on the display 4 is also altered accordingly.

When the mounting component 18 has been physically mounted on the base component 11 so as to coincide with the mounting component target image 18" superimposed over the live image 11' of the base component 11, the combined base component and mounting component become a new base component and the method is repeated with a further mounting component. Thus, if the base component is initially a mould and the initial mounting component is a fabric ply, then once the fabric ply has been mounted, the new base component is the mould and fabric ply and another fabric ply becomes the new mounting component to be placed thereon. Hence, fabric plies can be accurately stacked in sequence in a lay-up operation using the system 1.

Instructions 21 are provided on the display 4 (see FIG. 1) to help the user with the assembly process and may include displaying part numbers. For forming, say, a composite structure comprising plies, a ply given in the instructions can be selected so that the appropriate base component and mounting component will be displayed.

The computer 2 records the steps of juxtaposing components in the assembly process, and the user can play back any of the steps to check that components have been correctly assembled.

In a preferred embodiment, the tripod mounted transducer 6, the camera and base component locators 10,14 and the movable locator 16 form a commercially available co-ordinate measurement machine. A co-ordinate measurement machine may also be, for example, an articulated mechanical arm, a system with gyroscopes or an optical system utilising laser beams.

Figure 8:
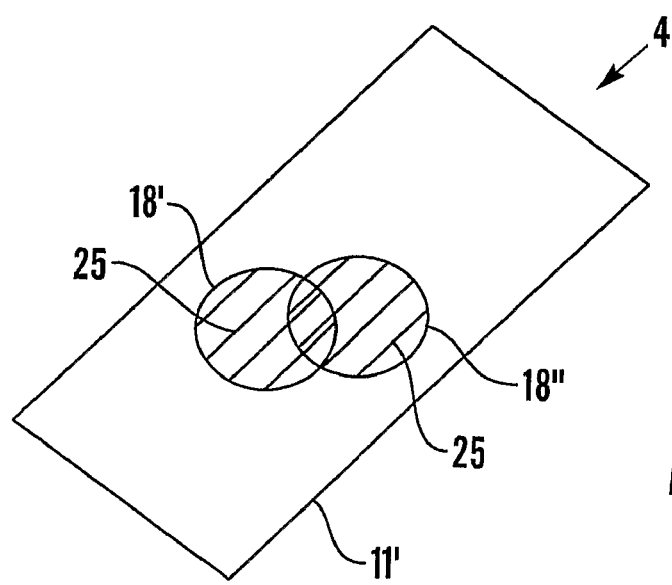
FIG. 8 shows an image of the mounting component and a mounting component target image having characteristic alignment.

In the figures, lines shown on the mounting component 18, the mounting component live image 18' and the mounting component target image 18" are to illustrate overlapping of these entities and not characteristic alignment. Referring to FIG. 8, the display 4 of the system can of course show such characteristic alignment 25 to enable correct characteristic alignment. This is useful when, for example, the mounting component live image 18' and the mounting component target image 18" are circular.

Figure 9:
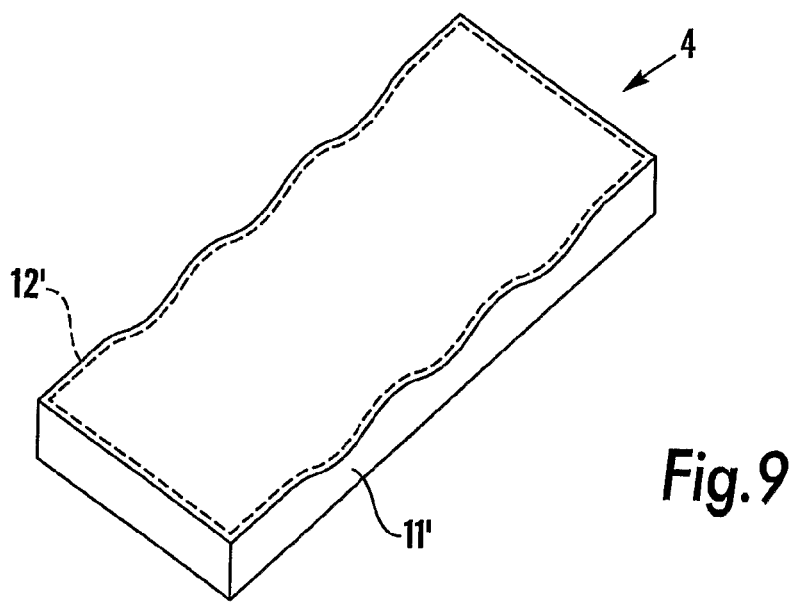
FIG. 9 shows an image of the mounting surface of the base component superimposed on a live image of the base component.

In one system modification illustrated in FIG. 9, an image 12' of the mounting surface 12 of the base component 11 generated by the computer 2 is also superimposed on the live image of the base component 11 displayed on the display 4.

Figure 10:
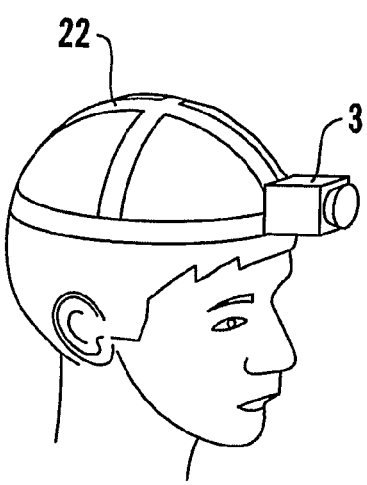
FIG. 10 shows an alternative way of mounting a camera for the system.
Figure 11:
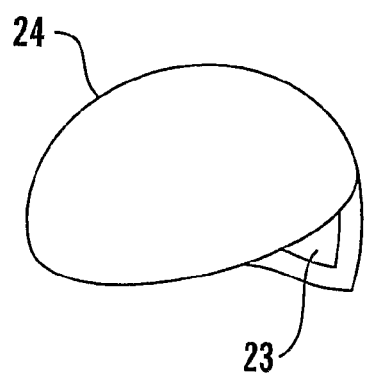
FIG. 11 shows an alternative display for the system.

Other modifications include the digital camera 3 having head mounting means 22 attachable to the head of a user of the system (see FIG. 10) instead of being mounted on a boom stand, and the display comprising a head-up display 23 (see FIG. 11) forming a visor of a helmet 24 to be worn by the user.

Whilst particular embodiments have been described, it will be understood that various modifications may be made without departing from the scope of the invention. For example, it is optional for the computer model to include a model of the mounting surface 12 of the base component 11.

The base component may have any suitably shaped mounting surface which may be flat or curved. The control unit 26 may be combined with the computer 2 and the camera 3 may transmit live images wirelessly to the computer.

The invention claimed is:

1. A method of juxtaposing components in an assembly process comprising the steps of:

forming a computer model of a mounting component to be mounted at a target location on a mounting surface of a base component;

providing a system including a computer, a camera, and a display device;

providing a base component and a mounting component;

determining the position and viewing direction of the camera relative to the base component;

displaying a live image on the display device of the base component as viewed by the camera;

displaying on the display device a mounting component target image generated by the computer of the mounting component mounted at the target location on the mounting surface superimposed over the live image of the base component; and moving the mounting component relative to the base component such that a live image of the mounting component as viewed by the camera coincides with the mounting component target image.

2. The method as claimed in claim 1, wherein the step of forming the computer model includes forming the model with the at least mounting surface of the base component.

3. The method as claimed in claim 1, including altering the display on the display device of the mounting component target image to take account of the relative movement between the camera and the base component.

4. The method as claimed in claim 1, wherein when the mounting component has been physically mounted on the base component so as to coincide with the mounting component target image superimposed over the live image of the base component, the combined base component and mounting component become a new base component and the method of claim 1 is repeated with a further mounting component.

5. The method as claimed in claim 1, including displaying on the display device an image of the mounting surface of the base component generated by the computer superimposed on the live image of the base component.

6. The method as claimed in claim 1, including displaying instructions for the assembly of the components.

7. The method as claimed in claim 1, including recording at least one said step of juxtaposing components in an assembly process so that at least one recorded step can be subsequently played back.

8. The method as claimed in claim 1, wherein the step of determining the position and viewing direction of the camera relative to the base component includes providing the camera with a camera locator, and using the computer to process signals from the camera locator to effect the determination.

9. The method as claimed in claim 8, including a further step of determining a position of the camera locator relative to the base component by:

providing a movable locator;

positioning the movable locator sequentially at plural predetermined location on the base component; and using the computer to process signals from the camera locator and the movable locator at said predetermined locations to determine the position of the camera locator relative to the base component.

10. The method as claimed in claim 8, including providing a transducer for receiving signals from at least one said locator.

11. The method as claimed in claim 10, including providing the base component with a base component locator, and using the computer to take account of relative movement between the base component and the transducer.

12. The method as claimed in claim 10, including providing each locator with at least three light sources and providing output signals from the transducer relating to light signals from said light sources.

13. The method as claimed in claim 1, including providing the mounting component target image with a target image point and the mounting component with a corresponding point marked thereon; and placing a part of the mounting component bearing the point on the base component before other parts of the mounting component once the live image of the mounting component and the mounting component target image coincide.

14. The method as claimed in claim 1, wherein the moving step includes orientating the mounting component to coincide with the orientation of the mounting component target image.

15. The method as claimed in claim 14, including providing the mounting component target image with an orientation indicator and the mounting component with a corresponding orientation mark marked thereon.

16. The method as claimed in claim 1, including calibrating the optical characteristics of the lens of the camera.

17. A system for juxtaposing components in an assembly process comprising:

a camera for viewing a base component;

display device for displaying a live image of the base component as viewed by the camera;

a computer having a computer model of a mounting component to be mounted at a target location on a mounting surface of the base component, the computer being arranged to determine the position and viewing direction of the camera relative to the base component, and generate and display on the display device an image of a mounting component target image at the target location superimposed over the live image of the base component.

18. The system as claimed in claim 17, including wireless optical means to enable the computer to determine the position and viewing direction of the camera relative to the base component.

19. The system as claimed in claim 17, wherein the camera has a camera locator adapted to emit signals for use in determining a position of the camera.

20. The system as claimed in claim 17, including a base component locator for mounting on the base component and adapted to emit signals for use in determining a position of the base component.

21. The system as claimed in claim 17, wherein the camera is mounted on a boom stand.

22. The system as claimed in claim 17, wherein the camera includes head mounting device attachable to the head of a user of the system.

23. The system as claimed in claim 17, wherein the display device comprises a computer screen.

24. The system as claimed claim 17, wherein the display device comprises a head-up display.

25. The system as claimed claim 17, wherein the camera comprises a digital and/or analogue camera.

* * * * *